US008457399B2

(12) United States Patent
Qi

(10) Patent No.: US 8,457,399 B2
(45) Date of Patent: Jun. 4, 2013

(54) HISTOGRAM-MODELING BASED ALGORITHM FOR CONTRAST ENHANCEMENT

(75) Inventor: Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 851 days.

(21) Appl. No.: 12/169,439

(22) Filed: Jul. 8, 2008

(65) Prior Publication Data

US 2009/0185743 A1 Jul. 23, 2009

Related U.S. Application Data

(60) Provisional application No. 61/021,831, filed on Jan. 17, 2008.

(51) Int. Cl.
*G06K 9/00* (2006.01)
*G06K 9/40* (2006.01)

(52) U.S. Cl.
USPC ........... 382/169; 382/168; 382/254; 382/265; 382/274

(58) Field of Classification Search
None
See application file for complete search history.

(56) References Cited

U.S. PATENT DOCUMENTS 7,102,697 B2 * 9/2006 Lei et al. ............ 348/678

FOREIGN PATENT DOCUMENTS

| EP | 0810551 A1 | 12/1997 |
|---|---|---|
| EP | 1223745 A2 | 7/2002 |
| JP | 7240166 A | 9/1995 |
| JP | 8329241 A | 12/1996 |
| JP | 2003281527 A | 10/2003 |

OTHER PUBLICATIONS

Buades, A., Coll, B., Morel, J.M.: Image enhancement by non-local reverse heat equation. Technical Report 22, CMLA (2006).*
Definition of Estimate, Collins English Dictionary—Complete & Unabridged 10th Edition [online], [Retrieved on Oct. 13, 2011]. Retrieved from the Internet: <URL: http://dictionary.reference.com/browse/estimate>.*
Definition of Spread, Collins English Dictionary—Complete & Unabridged 10th Edition [online], [Retrieved on Oct. 13, 2011]. Retrieved from the Internet: <URL: http://dictionary.reference.com/browse/spread>.*
Sapiro, Histogram Modification via Differential Equations, 1997, journal of differential equations vol. 135, pp. 238-268.*
Ang, A Method of Solution for the One-Dimensional Heat Equation Subject to Nonlocal Conditions, 2002, Southeast Asian Bulletin of Mathematics, vol. 26, pp. 185-191.*
"Laplace Transform" [online], 2012, downloaded from the Internet on Feb. 7, 2012, from <http://en.wikipedia.org/wiki/Laplace_transform>, pp. 1-23.*

(Continued)

*Primary Examiner* — Bravesh Mehta
*Assistant Examiner* — David F Dunphy
(74) *Attorney, Agent, or Firm* — Matthew J. Evans; James R. Gambale, Jr.

(57) ABSTRACT

A histogram modeling based technique for image contrast enhancement. In some implementations, a histogram of an image is created and then transformed. Using the physics of sound or heat propagation, the technique may develop a spreaded histogram model that may be transformed. A non-linear mapping may be created to remap an image for contrast enhancement. The technique may be performed without threshold tuning and may be implemented on a variety of display hardware.

27 Claims, 4 Drawing Sheets

OTHER PUBLICATIONS

Lamar et al. "Signal processing of acoustic signals in time domain with an active nonlinear, nonlocal cochlear model," D Signal Processing, vol. 86, pp. 360-374, 2006.*

Qi et al. "Global well-posed ness and multi-tone solutions of a class of nonlinear nonlocal cochlear models in hearing," D Nonlinearity vol. 17, p. 7110728, 2004.*

Qi et.al "A perception-and PDE-based nonlinear transformation for processing spoken words," Physica D, vol. 149, pp. 143-160, 2001.*

Srinivasan. Sujith & Balram. Nikhil: "44.2: Distinguished Paper: Adaptive Contrast Enhancement for Digital D Video," SID 07 Digest, 2007.*

International Search Report & Written Opinion—PCT/US2009/031304, International Search Authority—European Patent Office—Mar. 26, 2009.

Jain: "Histogram Modeling" Fundamentals of Digital Image Processing, Prentice-Hall International, Inc, US, Jan. 1, 1989, pp. 241-244, XP002333149 the whole document.

Perona P. et al: "Diffusion networks for on-chip image contrast normalization" Proceedings of the International Conference on Image Processing (ICIP) Austin, Nov. 13-16, 1994; [Proceedings of the International Conference on Image Processing (ICIP)], Los Alamitos, IEEE Comp. Soc. Press, US, vol. 1, Nov. 13, 1994, pp. 1-5, XP010146041 ISBN: 978-0-8186-6952-1 the whole document.

Peter Bock: "Smoothing of one and two-dimensional histograms with a diffusion algorithm" Journal of High Energy Physics, Institute of Physics Publishing, Bristol, GB, vol. 2006, No. 8, Aug. 1, 2006, pp. 56-056, XP020107155 ISSN: 1126-6708 sections 1-2.2.

Sapiro G et al: "Histogram modification via partial differential equations" Proceedings of the International Conference on Image Processing. (ICIP). Washington, Oct. 23-26, 1995; [Proceedings of the International Conference on Image Processing. (ICIP)], Los Alamitos, IEEE Comp. Soc. Press, US, vol. 3, Oct. 23, 1995, pp. 632-635, XP010197264 ISBN: 978-0-7803-3122-8 the whole document.

Sapiro G., et al., "Histogram Modification via Partial Differential Equations", Dec. 1994, http://www.hpl.hp.com/techreports/95/HPL-95-66.html.

Taiwan Search Report—TW098101825—TIPO—Mar. 23, 2012.

Lamar et al. "Signal processing of acoustic signals in time domain with an active nonlinear, nonlocal cochlear model," Signal Processing, vol. 86, pp. 360-374, 2006.

Qi et al. "Global well-posedness and multi-tone solutions of a class of nonlinear nonlocal cochlear models in hearing," Nonlinearity vol. 17, p. 7110728, 2004.

Qi et.al "A perception-and PDE-based nonlinear transformation for processing spoken words," Physica D, vol. 149, pp. 143-160, 2001.

Srinivasan. Sujith & Balram. Nikhil: "44.2: Distinguished Paper: Adaptive Contrast Enhancement for Digital Video," SID 07 Digest, 2007.

* cited by examiner

HISTOGRAM-MODELING BASED ALGORITHM FOR CONTRAST ENHANCEMENT

CLAIM OF PRIORITY UNDER 35 U.S.C. §119

The present Application for Patent claims priority to Provisional Application No. 61/021,831, entitled "A Histogram-Modeling Based Algorithm for Contrast Enhancement," filed Jan. 17, 2008, and assigned to the assignee hereof and hereby expressly incorporated by reference herein.

BACKGROUND

The process of contrast enhancement typically involves remapping the gray scale or intensity level of an image so that the image occupies all levels of available dynamic range. Until recently, contrast enhancement has been achieved by histogram equalization, where all available gray levels of a display have equal probability to be occupied by the pixels of an image. Histogram equalization, however, often over-stretches the distribution of pixels so that the resulting image has an artificial quality.

Another solution is contrast limited histogram equalization (CLHE), where exceptional peaks of a histogram are clipped to avoid their dominance in the equalized histogram. CLHE has several variations that consider the different sensitivities of visual perception at low, middle, and high levels. For example, CLHE can be done separately at different intensity regions if proper adjustments are made to ensure smooth transitions at the boundary of different regions. Setting the clipping thresholds so that the resulting image has the desired enhancement is difficult in CLHE as there are multiple thresholds. Human factors and biases play a role in the process, which makes it very subjective. Although algorithms have been proposed to estimate the thresholds automatically, they are not fully resolved. Consequently, CLHE is not a complete solution to the problem of contrast enhancement.

SUMMARY

A histogram modeling based technique for image contrast enhancement is described with reference to several implementations. In some implementations, a histogram of an image is created and then transformed. Using the physics of sound or heat propagation, the technique may develop a spreaded histogram model. Using the model, a nonlinear mapping may be created to remap an image for contrast enhancement. The technique may be performed without threshold tuning and may be implemented on a variety of display hardware.

In some implementations, a method for contrast enhancing an image may include determining a histogram of the image; applying a transform to the histogram to create an transformed histogram; determining estimated parameters of a spreaded histogram model associated with the transformed histogram; applying an inverse transform to the spreaded histogram model to create a spreaded histogram; and remapping the image using the spreaded histogram.

In some implementations, an apparatus for contrast enhancing an image may include a histogram engine that determines a histogram of the image, a transform engine that determines a transform of the histogram to create a transformed histogram, and a parameter estimation engine that determines a spreaded histogram model associated with the transformed histogram. An inverse transform may be applied to the spreaded histogram model to create a spreaded histogram. The image may be remapped using the spreaded histogram.

The foregoing is a summary and thus contains, by necessity, simplifications, generalizations, and omissions of detail. Those skilled in the art will appreciate that the summary is illustrative only and is not intended to be in any way limiting.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the present disclosure is not limited to the specific methods and instrumentalities disclosed. In the drawings.

DETAILED DESCRIPTION

Figure 1:
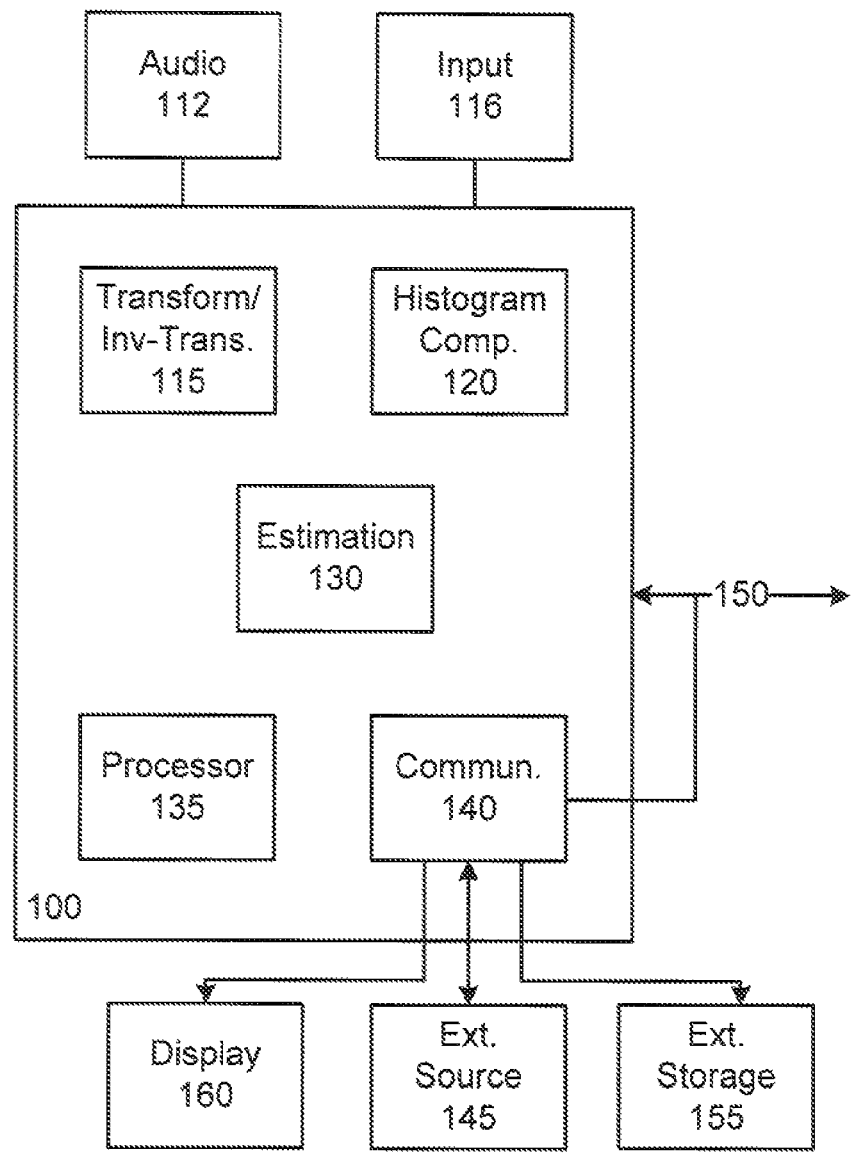
FIG. 1 is a block diagram of an exemplary general computing device for processing images.

According to implementations of the present disclosure, contrast enhancement may be accomplished using an algorithm based on histogram modeling and spreading. "Spreading" is based on the physics of sound or heat propagation and may be used to determined parameters that do not need threshold tuning to perform the enhancement. FIG. 1 depicts an example operational environment that may be used to practice aspects of the present disclosure. FIG. 1 is a block diagram of an exemplary general computing device 100 for processing images. The device 100 may include a transform component 115, a histogram computation component 120, an estimation component 130, a processor component 135, and a communications component 140. The processor 135 provides the computing platform to perform the processes of the other components.

The transform component 115 transforms histogram from one domain to another domain, such as the frequency domain in the case of DCT (discrete cosine transform) or FFT (fast Fourier Transform) of spatial data The transform component 115 may also perform inverse transformation such as the IDCT (inverse discrete cosine transform) or IFFT (inverse fast Fourier Transform). The transformations can be computed on a float-point or integer basis.

The histogram computation component 120 determines a histogram of an image. The histogram of an image is a graph showing the number of pixels in an image at each different intensity value found in that image. For an 8-bit grayscale image, there are 256 different possible intensities; therefore, its histogram will graphically display 256 numbers showing the distribution of pixels amongst those grayscale values. Histograms can also be taken of color images as either individual histograms of red, green and blue channels or luminance and chrominance channels of other 3-D color space, where each histogram represents the pixel count distribution of each channel.

The estimation component 130 may determine estimated parameters of a spreaded histogram model. The spreading is representative of properties of a physical process and is used to remap the intensity levels in the histogram over substantially of the available dynamic range. The estimation component 130 may also estimate parameters of Eigen functions of partial differential equations that are exponentially decaying sinusoids used to model the physical process.

The communications component 140 contains logic used to receive data to be encoded from an external source 145. The external source 145 could be, for example, external memory, the Internet, a live video and/or audio feed, and receiving the data can include wired and/or wireless communications. The communications component 140 also contains logic to transmit (Tx) encoded data over a network 150. The network 150 can be part of a wired system such as telephone, cable, and fiber optic, or a wireless system. In the case of wireless, communication systems, network 150 can comprise, for example, part of a code division multiple access (CDMA or CDMA2000) communication system or alternately, the system can be a frequency division multiple access (FDMA) system, a time division multiple access (TDMA) system such as GSM1GPRS (General Packet Radio Service)!EDGE (enhanced data GSM environment) or TETRA (Terrestrial Trunked Radio) mobile telephone technology for the service industry, a wideband code division multiple access (WCDMA), a high data rate (1×EVDO or 1×EV-DO Gold Multicast) system, or in general any wireless communication system employing a combination of techniques.

The device 100 may have connected thereto, or integrally include, an audio device 112 (e.g., earpiece, headset), and an input device 116 (e.g., keypad, keyboard, stylus). An external storage 155 may be, for example, external RAM or ROM, or a remote server. Image data may be presented on a display component 160, stored in the external storage 155 or stored in internal memory of processor component 135. The display component 160 may be an integrated part of the device that contains such parts as video display hardware and logic, including a display screen or it can be an external peripheral device. The communications component 140 may also contain logic used to communicate the image data to the external storage component 155 or the display component 160.

In the context of displayed images on, e.g., the display component 160, contrast enhancement is a remedy to overcome the ill-exposed (e.g., over or underexposed) images. Ill-exposed images tend to have pixels concentrated on a few, limited regions of available dynamic range. As a result, the image looks either too dark or too bright with few visible details. The histogram of such images is characterized by a few sharp peaks with sparsely occupied regions in between.

According to implementations, the algorithm may follow principles of physics of sound or heat propagation to provide a contrast enhancement technique that is automatic and needs little threshold tuning or human interaction. The algorithm may be real-time implementable, and the resulting enhanced image has a histogram that resembles the original histogram in terms of global characteristics. The enhanced image may have a histogram that occupies substantially all of the entire dynamic range of the display.

In accordance with the above, assuming the ill-exposed histogram is an initial heat profile or distribution of a conductor, this heat distribution will spread in an orderly and physically constrained manner. The spreading may stop as soon as the heat reaches the full scale. This spreading process has the properties that it is a physical process, where no threshold tuning or human interference is needed, and the spreaded heat profile closely resembles the characteristics of the original profile because the spreading is a physically constrained process. Heat would naturally and gradually reach the full scale available to it.

The above are representative properties of a contrast enhancement algorithm in accordance with the present disclosure. However, solving partial differential equations (PDE) used to determine heat propagation characteristics may be computationally expensive. However, the Eigen functions of the heat propagation PDE are exponentially decaying sinusoids that can be computed using a procedure, as described in FIG. 2.

Figure 2:
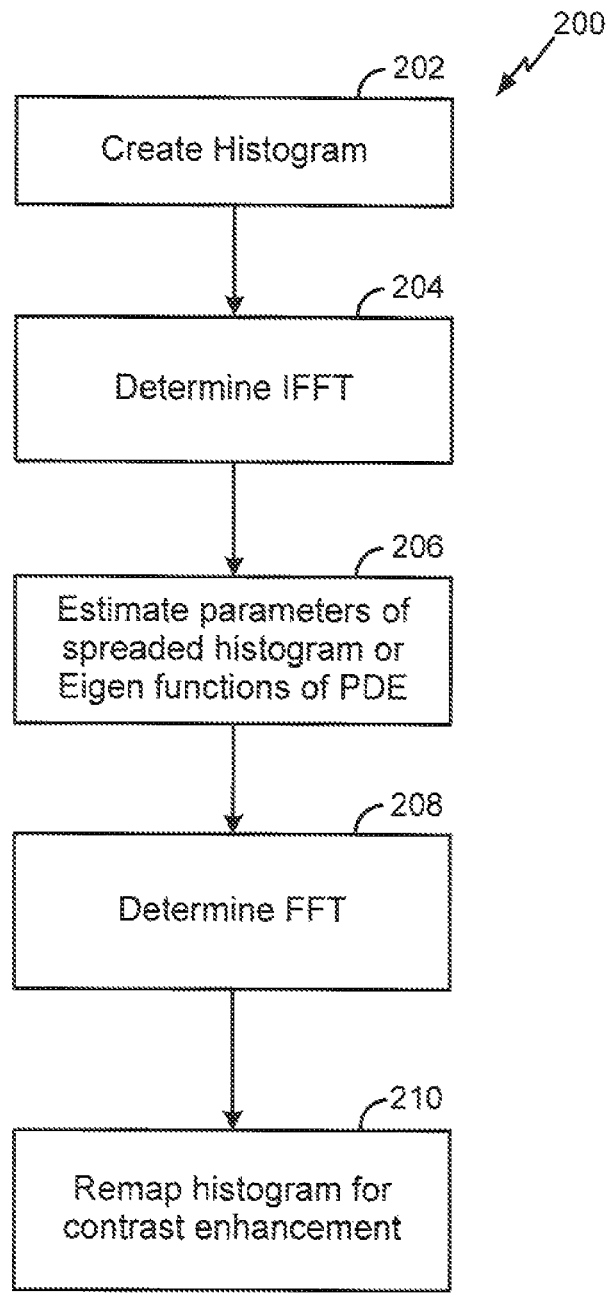
FIG. 2 is an exemplary flow diagram of a computational model for contrast enhancement of an image.

FIG. 2 is an exemplary flow diagram of a computational model 200 for contrast enhancement of an image. At 202, the histogram of the image is determined. For an 8-bit grayscale image a histogram may be determined that graphically displays 256 numbers showing the distribution of pixels amongst those grayscale values. Histograms can also be taken of color images as either individual histograms of red, green and blue channels or luminance and chrominance channels of other 3-D color space, where each histogram represents the pixel count distribution of each channel.

At 204, the IFFT (inverse fast Fourier transform) of the histogram is determined. The output of transform represents the histogram in the spatial domain equivalent. The IFFT may be determined by the transform component 115 and in some implementations where a 16-bin discrete histogram ht(i) i=0, 1, ..., 15, is available, the IFFT may be computed as:

$$H(k) = \left| \sum_{i=0}^{15} ht(i) e^{j\frac{ik\pi}{8}} \right|$$

At 206, parameters of the spreaded histogram model or Eigen functions of the (PDE) are determined. This may be performed by the estimation component 130. The value H(k) may be used to estimate model parameters using the following recursive algorithm:

(1) Initialization $a_0(0)=1$ $\epsilon_0 = H(0)$ (2) Recursion, for j=0, 1, ..., 6

$$\gamma_j = H(j+1) + \sum_{i=1}^{j} a_j(i) H(j-i+1)$$

$\Gamma_{j+1} = -\gamma_j / \varepsilon_j$

For $i = 1, 2, \ldots, j, a_{j+1}(i) = a_j(i) + \Gamma_{j+1} a(j-i+1)$ $a_{j+1}(j+1) = \Gamma_{j=0}$ $\varepsilon_{j+1} = \varepsilon_j [1 - \Gamma_{j+1}^2]$ (3) Finally, for k=0, 1, ..., 63

$$Hs(k) = 1 - \sum_{j=1}^{6} a_j Hs(k-j)$$

At 208, an FFT (fast Fourier transform) of the histogram model is determined. The FFT may be used to determine the spreaded histogram as follows:

$$hs(i) = \left| \sum_{k=0}^{63} Hs(i) e^{-j\frac{ik\pi}{32}} \right|$$

At 210, the nonlinear mapping for contrast enhancement is constructed.

$$hm(i) = \left| \sum_{j=0}^{i} hs(j) \middle/ \sum_{j=0}^{63} hs(j) \right| \quad i = 0, 1, \ldots, 64.$$

In the above, hm(i) may be linearly interpolated into an 8-bit, 256 point mapping function, as it is a smooth function.

This may be performed by instructions executing on the processor 135 in the device 100. In some implementations, nonlinear mapping functions may be use where the dynamic range of a processed image exceeds the capability of a display device. In such cases, only the brightest parts of the image are visible on the display screen. Nonlinear mapping may be used to compress the dynamic range of pixel values, using e.g., a logarithmic intensity mapping (transformation) function such that the complete image will be visible on the display.

Figure 3A:
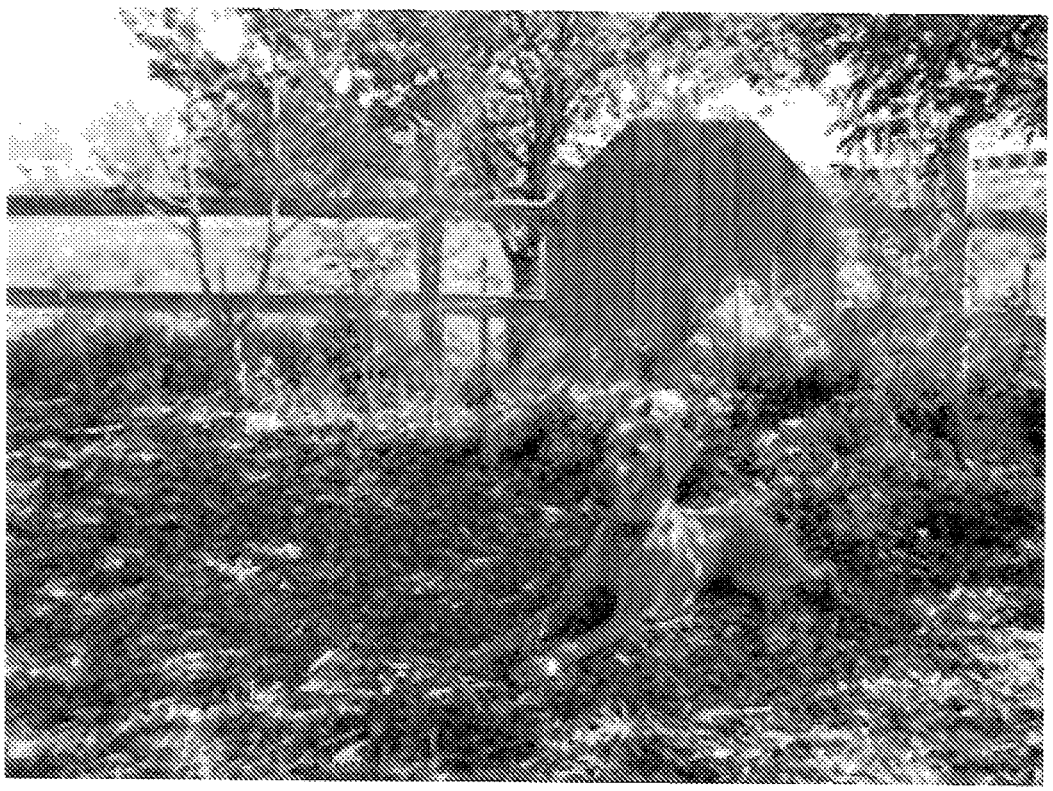
FIGS. 3A and 3B illustrate an exemplary original image and an exemplary contrast enhanced image.
Figure 3B:

FIGS. 3A and 3B illustrate an exemplary original image and an exemplary contrast enhanced image. In the image of FIG. 3A, a dog and a shed are shown, but are hard to discern due to poor contrast. The contrast enhanced image of FIG. 3B may be generated using the contrast enhancement implementations described herein. As shown, the details within the image of FIG. 3B are more visible and discernable in the enhanced image.

Figure 4A:
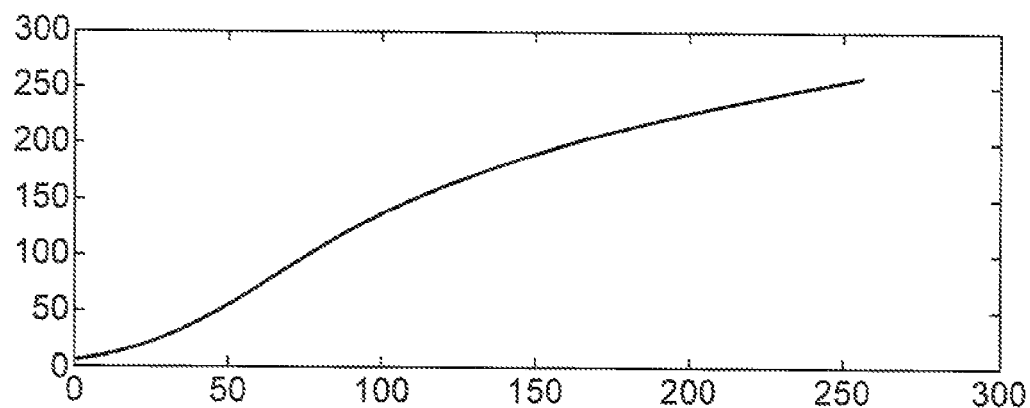
FIG. 4A illustrates an exemplary nonlinear mapping function to enhance the image of FIG. 3A to generate the image of FIG. 3B.
Figure 4B:
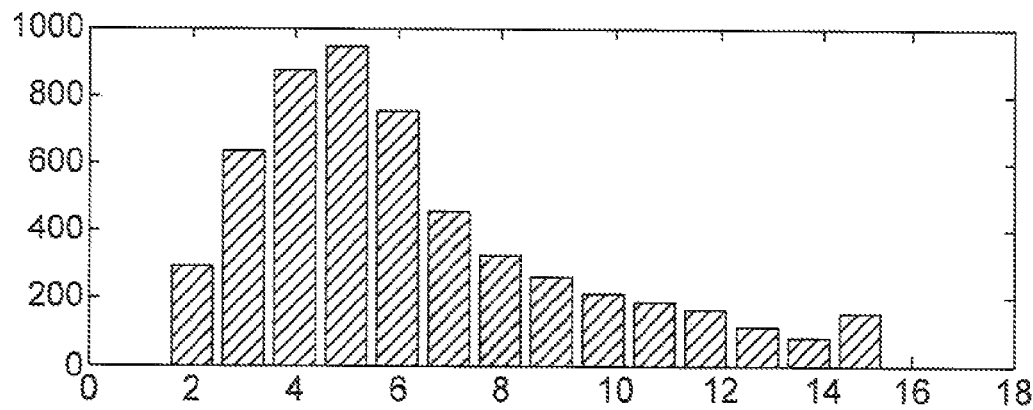
FIG. 4B illustrates a histogram of the image in FIG. 3A.
Figure 4C:
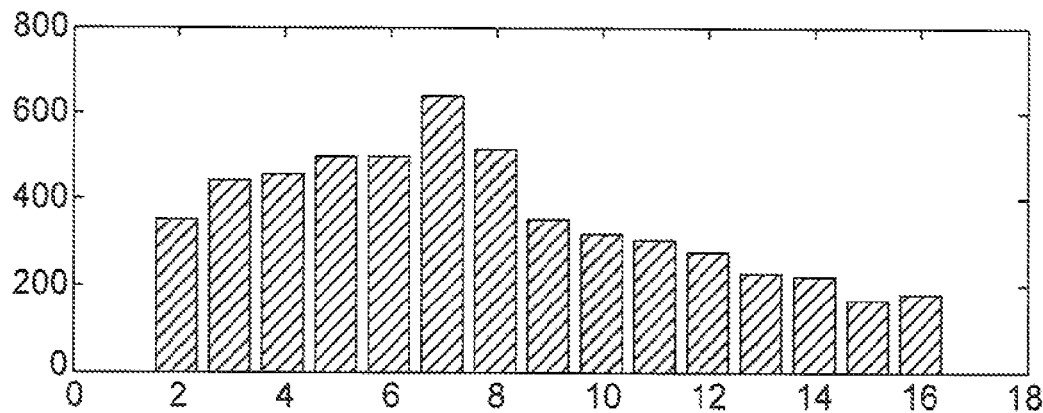
FIG. 4C illustrates a histogram of the contrast enhance image of FIG. 3B.

FIG. 4A illustrates an exemplary nonlinear mapping function. FIG. 4B illustrates a histogram of the image in FIG. 3A, and FIG. 4C illustrates a contrast enhance version of the histogram of FIG. 4B. In accordance with implementations of the present disclosure, the nonlinear mapping function in FIG. 4A may be applied to the original histogram of FIG. 4B at 210 in FIG. 2 to produce the contrast enhanced histogram shown in FIG. 4C and the contrast enhanced image shown in FIG. 3B. The histograms of FIGS. 4B and 4C share substantially the same global characteristics, and the histogram of FIG. 4C occupies substantially all of the available dynamic range.

Thus, a comparison between the original and the processed histograms indicates that the implementations of the present disclosure spread the original histogram while protecting its overall global characteristics. The processed or enhanced images also show more detail than the original images.

With regard to the a device 100 in FIG. 1, numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device.

One or more programs may implement or utilize the processes described in connection with the presently disclosed subject matter, e.g., using an application programming interface (API), reusable controls, or the like. Such programs may be implemented in a high-level procedural or object-oriented programming language to communicate with a computer system. However, the program(s) may be implemented in assembly or machine language, if desired. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for contrast enhancing an image, comprising:
determining a histogram of the image, to create determined histogram data;
spreading the determined histogram data by applying propagation characteristics defined by the heat propagation partial differential equation directly to the determined histogram data to produce a spreaded histogram comprising spreaded histogram data, by executing instructions on image processing hardware;
remapping the image using the spreaded histogram data to produce a remapped image; and
displaying the remapped image on a display.

2. The method of claim 1, wherein the histogram and the spreaded histogram have substantially similar global characteristics.

3. The method of claim 1, further comprising determining a mapping function in accordance with a spreaded histogram model.

4. The method of claim 1, further comprising remapping the image to utilize substantially an entire dynamic range of a display device.

5. The method of claim 1, wherein spreading comprises:
applying a transform to the histogram to create a transformed histogram;
determining estimated parameters of a spreaded histogram model associated with the transformed histogram; and
applying an inverse transform to the spreaded histogram mode to create the spreaded histogram.

6. The method of claim 5, wherein determining estimated parameters of a spreaded histogram model associated with the transformed histogram comprises recursively determining a first parameter and a second parameter over a series having a predetermined length.

7. The method of claim 6, wherein applying an inverse transform to the spreaded histogram model to create a spreaded histogram comprises summing the spreaded histogram model over a second series having a second predetermined length.

8. The method of claim 1, wherein spreading comprises solving the heat propagation partial differential equation.

9. The method of claim 1, comprising spreading the histogram until the spreaded histogram reaches full scale.

10. An apparatus for contrast enhancing an image, comprising:
a memory;
a processor electrically connected to the memory;
a histogram component configured to determine a histogram of an image, the histogram comprising determined histogram data; and
a transform component configured to spread the determined histogram data by applying propagation characteristics defined by the heat propagation partial differential equation directly to the determined histogram data to produce a spreaded histogram comprising spreaded histogram data,
wherein the image is remapped using the spreaded histogram data.

11. The apparatus of claim 10, wherein spreading the histogram comprises solving the heat propagation partial differential equation.

12. The apparatus of claim 10, further comprising:
a parameter estimation component configured to determine estimated parameters of a spreaded histogram model;
wherein the transform component is further configured to spread the histogram by:
applying a transform to the histogram to create a transformed histogram;
determining estimated parameters of the spreaded histogram model associated with the transformed histogram; and
applying an inverse transform to the spreaded histogram model to create a spreaded histogram.

13. The apparatus of claim 12, wherein a parameter estimation component recursively determines a first parameter and a second parameter over a series having a predetermined length, and wherein the first parameter is summed over the series to determine the spreaded histogram model.

14. The apparatus of claim 13, wherein the transform component is further configured to determine a spreaded histogram based on a spreaded histogram model by summing the spreaded histogram over a second series having a second predetermined length.

15. The apparatus of claim 13, wherein a mapping function is determined in accordance with the spreaded histogram model.

16. The apparatus of claim 13, wherein the spreaded histogram is configured to utilize substantially an entire dynamic range of a display device.

17. The apparatus of claim 10, comprising spreading the histogram until the spreaded histogram reaches full scale.

18. A non-transitory, computer-readable medium comprising computer-readable instructions for contrast enhancing an image, the instructions performing the method of:
determining a histogram of an image, the histogram comprising determined histogram data;
spreading the determined histogram data by applying propagation characteristics defined by the heat propagation partial differential equation directly to the determined histogram data to produce a spreaded histogram comprising spreaded histogram data; and
remapping the image using the spreaded histogram data.

19. The non-transitory, computer-readable medium of claim 18, further comprising remapping the image to utilize an entire dynamic range of a display device.

20. The non-transitory, computer-readable medium of claim 18, further comprising instructions for:
applying a transform to the histogram to create a transformed histogram;
determining estimated parameters of a spreaded histogram model associated with the transformed histogram; and
applying an inverse transform to the spreaded histogram model to create the spreaded histogram.

21. The non-transitory, computer-readable medium of claim 20, wherein determining estimated parameters of a spreaded histogram model associated with the transformed histogram comprises:
recursively determining a first parameter and a second parameter over a series having a predetermined length; and
summing the first parameter over the series to determine the spreaded histogram model.

22. The non-transitory, computer-readable medium of claim 20, further comprising instructions for determining a mapping function in accordance with the spreaded histogram model.

23. The non-transitory computer readable medium of claim 18, wherein spreading the histogram comprises solving the heat propagation partial differential equation.

24. The non-transitory computer readable medium of claim 18, wherein spreading the histogram comprises spreading the histogram until the spreaded histogram reaches full scale.

25. An apparatus for contrast enhancing an image, comprising:
means for determining a histogram of an image the histogram comprising determined histogram data;
means for spreading the determined histogram data by applying propagation characteristics defined by the heat propagation partial differential equation directly to the determined histogram data to produce a spreaded histogram comprising spreaded histogram data, wherein the image is remapped using the spreaded histogram data.

26. The apparatus of claim 25, further comprising:
means for transforming the original histogram to create a transformed histogram;
means for determining estimated parameters of the spreaded histogram model associated with the transformed histogram; and
means for applying an inverse transform to the spreaded histogram model to create a spreaded histogram.

27. The apparatus of claim 25, wherein the means for spreading the histogram is configured to solve the heat propagation partial differential equation.

* * * * *